UNITED STATES PATENT OFFICE.

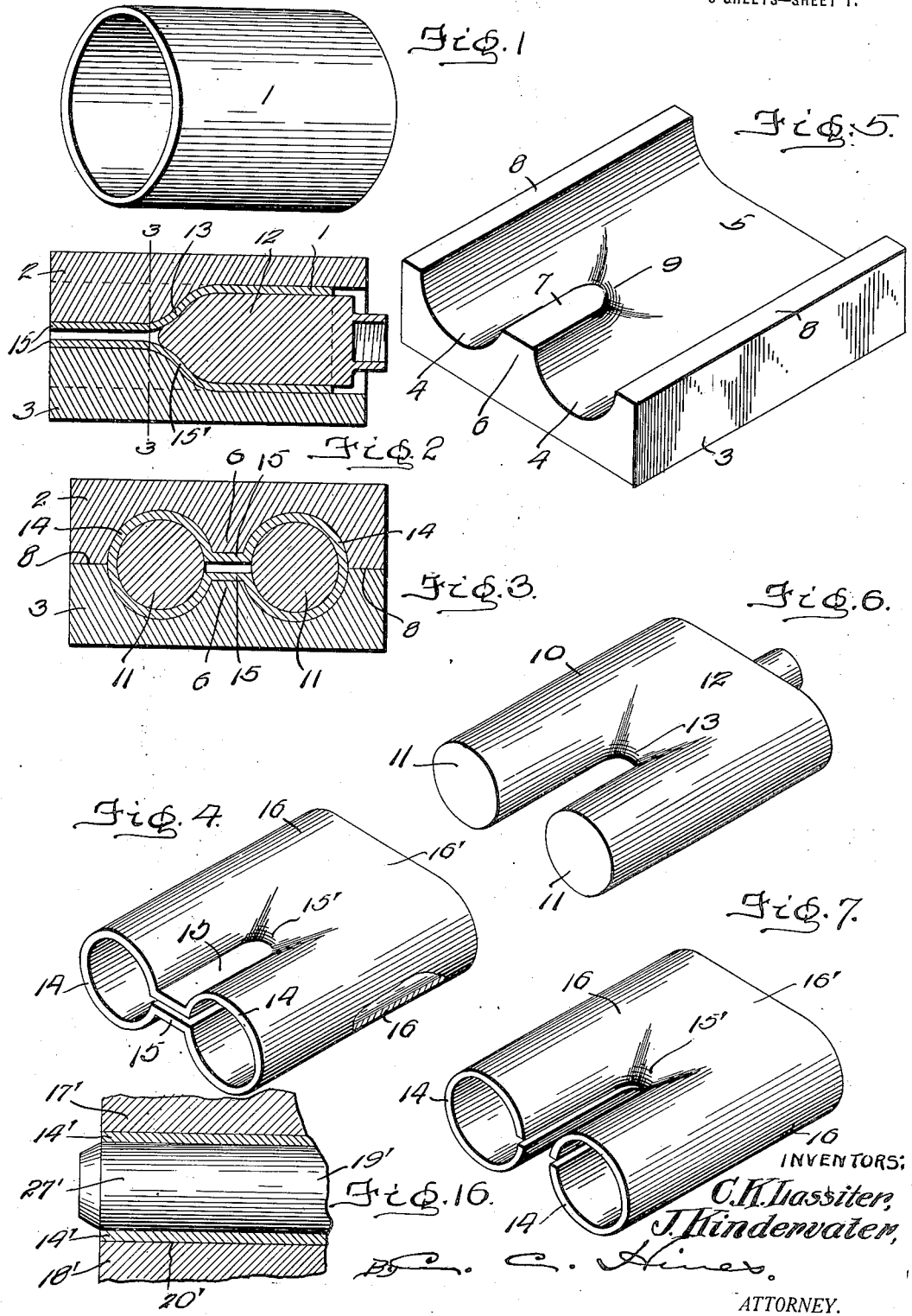

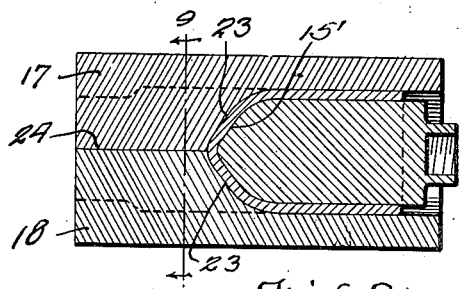
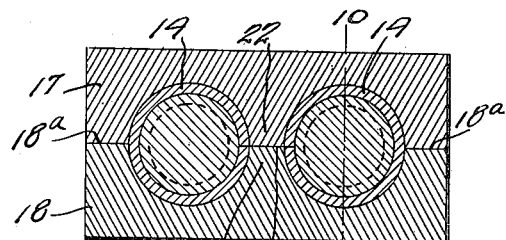
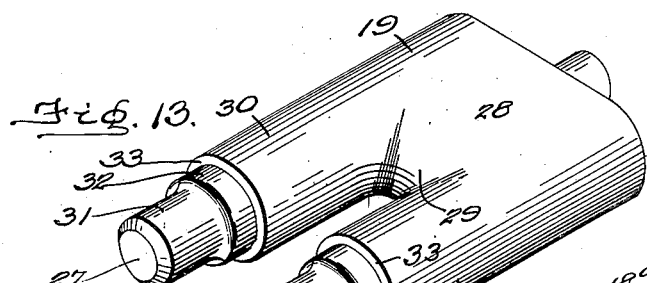
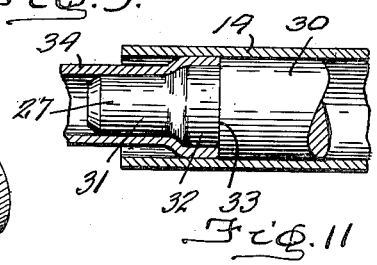
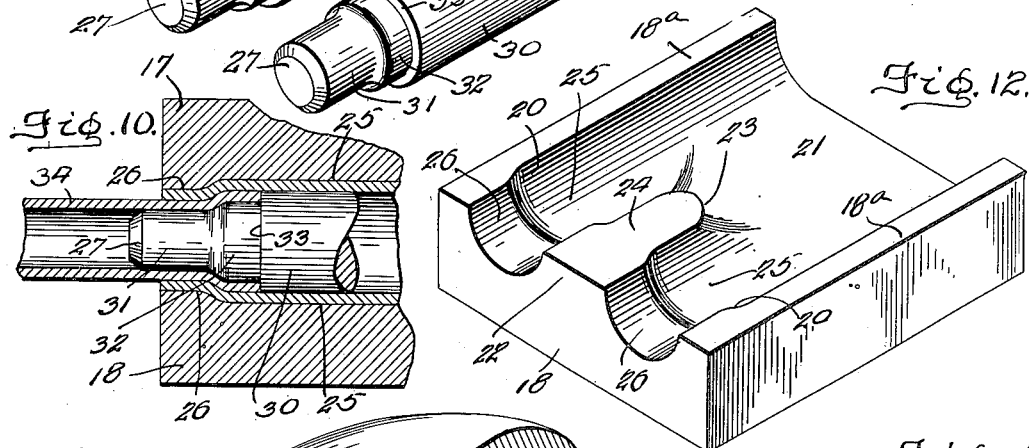
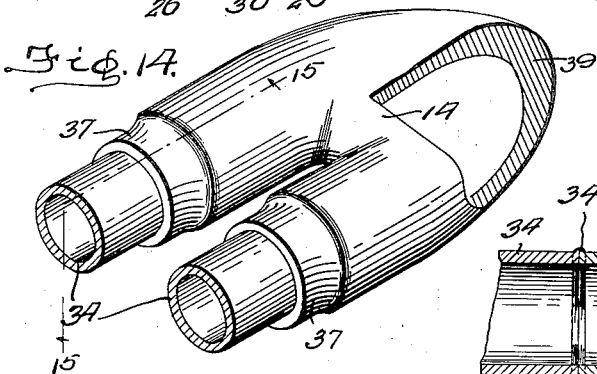
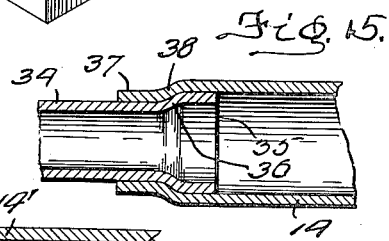

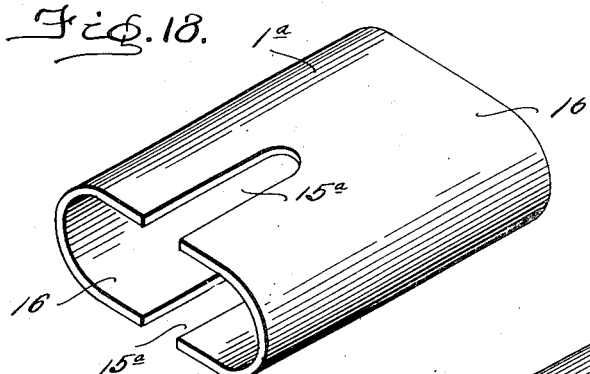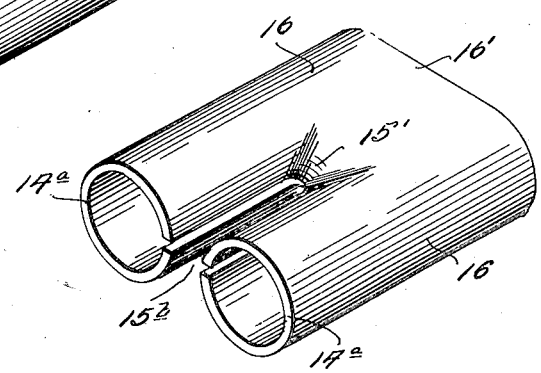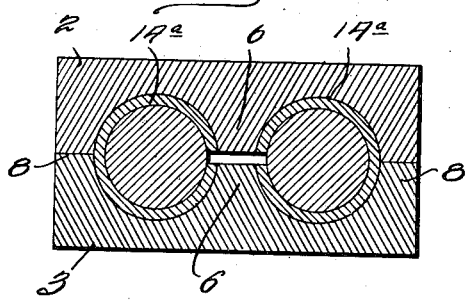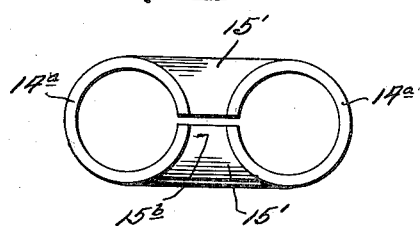

COLUMBUS K. LASSITER AND JULIUS KINDERVATER, OF NEW YORK, N. Y.

METHOD OF MAKING RETURN BENDS.

1,417,393.    Specification of Letters Patent.    Patented May 23, 1922.

Application filed November 24, 1920. Serial No. 426,246.

*To all whom it may concern:*

Be it known that we, COLUMBUS K. LASSITER and JULIUS KINDERVATER, citizens of the United States, residing at New York, in the county of New York and State of New York, have invented new and useful Improvements in Methods of Making Return Bends, of which the following is a specification.

This invention relates to a method of making what are commonly known as return bends for use in various conducting systems where such bends are used, whether for steam, air, ammonia, or other liquid, gaseous or solid substances, and is particularly advantageous in the manufacture of superheater elements for smoke tube superheaters.

More particularly the invention relates to the manufacture of return bends of the breeches-type as a distinct unit or article of manufacture from the pipes or tubes which are to be joined thereto by welding or in some other suitable manner, as contradistinguished from that type of return bends in which the end portions of the tubes to be joined are themselves fashioned into such a return bend whereby the tubes and bends are integrally joined.

In a prior Patent No. 1,083,688, dated Jan. 6, 1914, granted to C. K. Lassiter, one of the present applicants, there is disclosed a forged or pressed steel return bend of the distinct-unit type above mentioned. In this prior Lassiter structure the tubes are butt-welded to the two legs or cylindrical projections at one end of the bend and the other end of the bend is closed by a separately formed cap welded thereto. The present invention applies especially to a further development of such Lassiter distinct-unit structure and to a novel mode of making return bends of the distinct-unit type in general from a piece of tubular stock. According to the present invention, one end of a piece of circular or elliptical tubing is shaped to form the legs to which the pipes or tubes may be butt-welded, lap-welded or otherwise suitably secured, while the other end of the tube is closed and welded to form the cap-end and complete the formation of the article. In this application we have specifically set forth and claimed our novel and improved method of making the leg-end of the return bend, the cap-end of the bend being formed, within the scope of this invention, in any suitable or preferred way.

The object of the present invention may, therefore, be stated as the providing of an improved method of making the leg-end of a return bend of the class described. Our improved method of manufacture permits of spacing the pipes or tubes further apart than is possible with a return bend formed from the tubes by splitting and welding. In this latter process if a greater distance is desired the introduction of a suitable strip is necessary, requiring four welds to make the bend. Our improved method also provides for a more durable and satisfactory weld of the bend at the crotch point, and enables the pipe ends to be fitted and welded in the legs in such manner as to strengthen and increase the rigidity and durability of the connection.

Our invention will be better understood by reference to the accompanying drawings, in which:—

Figure 1 is a view in elevation of a piece of tubing from which the bend is formed.

Figure 2 is a central longitudinal section through the forming dies and tube, illustrating the first step of the method.

Figure 3 is a transverse section on line 3—3 of Figure 2.

Figure 4 is a perspective view of the incomplete bend as it appears upon completion of the first step of the method.

Figure 5 is a view of one of the forming dies.

Figure 6 is a view of the forming mandrel.

Figure 7 is a view of the incomplete bend illustrating the next step of the process.

Figure 8 is a section similar to Figure 2 of the welding dies and incomplete bend, illustrating the final step in forming and welding the leg-end.

Figure 9 is a transverse section on line 9—9 of Figure 8.

Figure 10 is a longitudinal section on the plane indicated by the line 10—10 of Figure 9, showing the connection of a pipe with a leg of the bend at the completion of the welding operation.

Figure 11 is a section similar to Figure 10, omitting the dies, showing the parts as they appear when fitted in position prior to the welding operation.

Figure 12 is a view of one of the welding dies.

Figure 13 is a view of the welding mandrel.

Figure 14 is a perspective view of the completed bend and pipes joined thereby.

Figure 15 is a detail section on line 15—15 of Figure 14.

Figure 16 is a sectional view similar to Figure 10, illustrating a modification in the operation of closing and welding the leg-end of the bend.

Figure 17 is a detail view illustrating a butt-weld connection between a pipe and leg of the bend.

Figure 18 is a view of a modified form of tubular stock which may be employed.

Figure 19 is a view similar to Figure 3, showing the operation of shaping the same between the forming dies and mandrel.

Figure 20 is a perspective view of the incomplete bend directly formed by the shaping dies and mandrel from the stock shown in Figure 18.

Figure 21 is an end view of such incomplete bend.

In carrying our invention into practice, we form the return bend from a piece of steel tubing 1 of suitable length and diameter. This tube is held and preliminarily shaped between two counterpart die members 2 and 3. The lower die member 3 is shown in Figure 5 and comprises a block having at one end two parallel semi-circular grooves 4 merging at their inner ends into a semi-elliptical cross-channel or cavity 5. The grooves 4 are separated by an intermediate rib 6 having its inner face 7 terminating a predetermined distance below the horizontal plane of the abutment faces 8 at the sides of the block. The rib 6 has at its inner end a continuation in the form of a substantially triangular or wedge-shaped boss 9 which extends therefrom toward the opposite end of the block and whose upper face inclines or slopes toward the bottom of the channel and merges thereinto. At its apex portion, which joins the inner end of the rib, the boss is of the same width as the rib, the sides of the boss thence diverging and the boss gradually increasing in width until at its base it is both materially shallower and wider than the rib. Before placing the tube in the die members it is raised to a welding heat. The tube is then partially collapsed by pressing or hammering between the dies, a breeches mandrel 10 then inserted into the tube, and the pressing or hammering operation continued until the dies are completely closed and their faces 8 abut. As shown in Figure 6, the mandrel 10 is provided with a pair of parallel cylindrical legs 11 for co-operation with the grooves 4, an elliptical body portion 12 for cooperation with the cavity 5, and a wedge-shaped crotch portion 13 for cooperation with the bosses 9. The compression of the tube between the surfaces of the dies and mandrel results in the production of the partially completed bend of the form shown in Figure 4, the same having at one end two incomplete tubular legs or sockets 14, split along their inner sides, upper and lower bridge pieces 15 connecting similar edge walls of the incomplete or split legs, and abdominal-shaped crotch-forming webs 15' connecting said walls and bridge pieces with the body portions of the walls 16 from which they are formed, the opposite end 16' of the bend being open and of substantially elliptical form in cross section and comprising the part of the incomplete bend which is to be subsequently shaped to form the closed cap portion. It will be observed that the ribs 6 are of relatively less depth than the sides of the dies having the abutment faces 8, and that the rib faces 7 terminate in horizontal planes which lie inwardly of the horizontal planes of said faces 8. Hence when the dies are closed and the faces 8 of the die members abut, the faces 7 of the opposed ribs 6 and the opposed surfaces of the bosses 9 lie in spaced relationship to each other. This spaced relationship is such as to leave the opposed marginal inner edges of the incomplete tubular legs 14, the opposed bridge pieces 15 and the opposed edges of the crotch webs 15', formed by the die surfaces, in approximate and matching relationship but spread apart. As a result the inner sides of the legs and the crotch portion of the partly completed bend shown in Figure 4 are left open or in bifurcated condition, or, in other words, opposed surfaces of these parts which are to be welded to complete their formation are separated by a narrow gap or slot extending continuously around the inner sides of the legs and the crotch, while at the same time the bridge pieces are correspondingly spaced to form a connecting passage between the slotted sides of the legs and slotted crotch. This is an important feature of the present method in so far as it applies to the use of a piece of circular stock, as the tube 1, for reasons hereinafter fully explained.

The next step of the method consists in taking the partially formed bend shown in Figure 4 and, in any suitable manner, punching or cutting out the bridge pieces 15 up to the lines of the webs 15'. This leaves the partially complete bend as shown in Figure 7 with the bridge pieces cut away but with the legs and crotch still in open or slotted and incomplete form. Such partially complete bend shown in Figure 7 is then heated to welding heat and subjected to the action of a pair of counterpart welding dies 17 and 18 and a cooperating welding mandrel 19, whereby the legs and crotch are closed and the previously open walls thereof welded to complete the formation of the leg-end proper of the bend.

The welding dies 17 and 18 and the welding mandrel 19 are or may be, with certain exceptions, substantial duplicates of the forming dies 2 and 3 and mandrel 10. As shown by the lower welding die member 18 illustrated in Figure 12, the die members 17 and 18 are each provided with the semi-circular leg-forming grooves 20, shaping cavity 21, rib 22 and boss 23, similar to the portions 4, 5, 6 and 9 of the dies 2 and 3 with the exception that the bridge forming face 24 of the ribs 22 lie in the same plane as the side abutment surfaces 18ª and that said faces 24 and web-forming surfaces of the bosses 23 are of greater depths than the corresponding portions of the dies 2 and 3, and with the further exception that the grooves 20 are formed of relatively deep inner portions 25 and shallow outer portions 26, the portions 25 being of less diameter than the grooves 4 of the dies 2 and 3. The mandrel 19, like the mandrel 10, is provided with the circular leg ends 27, elliptical end portion 28, and wedge-shaped surfaces 29, which are similar to the portions 11, 12 and 13 of the mandrel 10 with the exception that each leg is provided with an inner circular portion 30 of major diameter, an outer circular portion 31 of minor diameter, an intermediate circular shaping surface 32 of mean diameter, and an abutment shoulder 33 at the point of intersection of said surfaces 30 and 31.

The dies 17 and 18 and mandrel 19, specifically constructed as above described, are designed for a specified mode of closing and welding the legs and crotch of the bend and simultaneously lap-welding and mechanically interlocking therein the ends of the tubes or pipes 34 which are to be joined by the bend, which operation we will now proceed to describe, although the invention is not restricted to this particular mode of connecting the pipes 34 with the bend, as the legs and crotch of the bend may first be closed and welded and the pipes 34 then otherwise joined to the legs of the bend, as by butt-welding, as hereinafter described, this invention being directed to the mode of making the leg-end per se without regard to any particular mode of connecting the pipe ends therewith.

Referring to Figures 8 to 15, inclusive, illustrating the use of the dies 17 and 18 and mandrel 19, it is to be understood that the dies, mandrel, bend and pipes having been assembled, with the pipe ends fitted in the split legs, the pipe ends and bend being heated to welding temperature, the normally spaced dies are subjected to hammer blows or pressure until they are fully moved from initial to the fully closed position shown in Figures 8 and 9, in which their abutment surfaces 18ª contact. This action causes the forming surfaces of the dies to contract or shrink the split legs of the bend about the legs of the mandrel and the pipe ends, thereby closing the clefts in the legs and crotch and welding the edge walls thereof together and simultaneously welding the pipe ends within and to the legs. By this operation a strong and durable welding connection is secured, inasmuch as the free space between the legs and the presence of the clefts allows free passage of heat to and between the surfaces to be welded, with the result that they will be uniformly heated and a more perfect weld obtained, while the drawing of the legs about the pipe ends ensures a most perfect connection. It will be observed that the removal of the bridge pieces 15 not only permits this to be done, but is of particular importance in eliminating excess material which is a disturbing factor when electrical resistance welding is resorted to which, for its satisfactory operation, requires the resistance units, i. e., the area of the parts to be heated and welded, to be substantially uniform. The shoulders 33 of the mandrel 19 limit the insertion of the pipe ends 34 to the exact degree while the surfaces 31 fit within and support the pipe ends adjacent to their extremities during the shaping and welding action. The extremity of each pipe end is initially, or by the spreading action of portion 32 of the mandrel leg entering the same, enlarged or expanded, as at 35, and fits about the mandrel surface 32, thus providing a shoulder 36, and the surfaces 26 of the dies contract the extremities of the legs, as at 37, about the body of the pipe beyond said shoulder 36, forming a shoulder portion 38 in the leg which contacts with and lies beyond the shoulder 36. By this construction a mechanical interlock between the leg and pipe is provided which reinforces the weld and tends to prevent possible separation of the parts under strains and thus adds to the security of the connection. At the conclusion of the leg closing and welding operation above described, the dies and mandrel are removed and the open end of the bend subjected to proper treatment to form a closed cap end 39, as shown in Figure 14, thus completing the operation of forming the bend as an entirety and applying it to the ends of the pipes which are to be connected thereby. We have not described herein any particular way of forming the cap end of the bend, as this may be performed by any of the methods heretofore employed in the art, or by the method set forth in our copending application filed Nov. 24, 1920, Serial No. 426,249.

Instead of simultaneously closing and welding the split walls of the leg-end of the bend and welding the pipe ends therein, we may, as before stated, first complete the formation of the leg-end and then weld the pipes thereto. For this purpose we employ, as shown in Figure 16, dies 17' and 18' which are similar in construction to the dies 17 and 18 except that the grooves 20' are of like diameter throughout, namely, of the same diameter as the portions 25 of grooves 20, and a mandrel 19' which is the same construction as the mandrel 19 except that the legs 27' thereof are of uniform diameter throughout, namely, of the same diameter as the portions 30 of legs 27. Such dies 17' and 18' and mandrel 19' are employed to close and weld the split portions of the leg end of the bend prior to the welding of the pipes and bend together. The closed and welded legs 14' of the bend thus produced, one of which is shown in Figure 17, will be of uniform diameter throughout and may match in diameter the end of the pipe 34 which is to be joined thereto, and these parts may be butt-welded together, as indicated at 34'. Also other ways of connecting pipes to the legs of a return bend so formed may be employed within the spirit and scope of our invention.

Referring to Figures 18 to 21, inclusive, in order to avoid the formation of the bridge-pieces 15 and the necessity of cutting them out, we may employ a piece of tubular stock 1ª of the character shown in Figure 18. As shown in this figure, the stock 1ª comprises a flattened tube of elliptical form in cross-section and having its relatively flat and parallel walls 16 provided at one end with cutaway portions or slots 15ª. These slots are designed to receive and admit passage of the ribs 6 of the dies 2 and 3 in the shaping operation, as shown in Figure 19, as a result of which an incomplete bend of the form shown in Figures 19 and 21, corresponding to that shown in Figure 7, devoid of the bridge pieces 15 shown in Figure 4, will be directly produced from the piece of tubing, no bridge pieces 15 or like interconnecting portions between the legs being formed to be subsequently cut out. The tube 1ª used may be initially of the elliptical form shown, or it may be reduced to such form from an initially circular form, and in the latter event the slots 15ª may be produced in the stock before or after its change of shape, as desired or manufacturing conditions may require.

The operations of shaping and welding by hammer blows or pressure may be performed in any of the ways or by the use of any of the devices for the purpose well known in the art. We, however, particularly contemplate performing these operations on a suitable type of press, such as an Ajax press.

A material advantage flowing from our improved method of making the leg-ends of return bends is that, by using a certain size of tubular stock, the legs may be spaced farther apart, to correspondingly space the pipes, than is possible with a return bend formed from the pipes themselves by splitting and welding, and, by using different diameters of stock, this spacing may be further increased and varied as desired. Our process also provides for a more durable and satisfactory weld of the bend at the crotch and, if so desired, enables the pipe ends to be so fitted and welded within the legs as to greatly strengthen and increase the stability of the connection. Our method of forming the legs also provides for the more uniform and efficient heating of the surfaces to be welded to enable a better weld to be obtained. A stronger and more reliable and efficient circulating unit may also be produced, a very desirable advantage in the manufacture of superheater elements for smoke tube superheaters. Furthermore, the present invention provides a highly practicable mode of making the leg-end of a bend from a single piece of tubing, allowing stock of this kind to be used in the production of a complete bend without practical obstacles or disadvantages.

Having thus fully described our invention, we claim:—

1. The method of making the leg end of a return bend, which consists in shaping one end of a piece of tubular stock to form leg and crotch portions divided by a cleft across the crotch and along the inner sides of the legs, introducing a mandrel through the opposite end of the stock to back the leg and crotch portions, subjecting said leg and crotch portions to the action of dies and while under welding heat so as to close said cleft and weld the walls thereof, said dies having surfaces which enter the space between the legs and cooperate with the mandrel for a backing action in said cleft closing and welding operation, and then suitably closing the said opposite end of the bend.

2. The method of making the leg-end of a return bend, which consists in shaping one end of a piece of tubular stock so as to form split leg and crotch portions, opposed walls of which are separated by a cleft extending around the inner sides of the legs and the crotch portion and similar walls of which are connected by spaced bridge pieces extending across the space between the legs, cutting or punching out said bridge pieces, and then closing said cleft and welding said opposed walls together.

3. The method of making the leg-end of a return bend, which consists in compressing one end of a piece of tubular stock so as to form split leg and crotch portions, opposed walls of which are separated by a cleft extending around the inner sides of the legs and the crotch portion, removing any excess material which may be caused by such formation so as to leave the space between the legs free and clear, then closing said cleft and welding said walls together, and then closing the opposite end of the bend.

4. The method of making the leg-end of a return bend, which consists in compressing one end of a piece of tubular stock between dies so as to form incomplete leg and crotch portions having opposed walls separated by a cleft extending around the inner sides of the legs and the crotch, similar walls of said portions being connected by bridge pieces extending across the space between the legs, removing said bridge pieces so as to leave the space between the legs free and clear, and then compressing the leg and crotch portions between dies in the presence of welding heat so as to close said cleft and weld said opposed walls together.

5. The method of making the leg-end of a return bend, which consists in shaping one end of a piece of tubular stock so as to form a pair of parallel legs and a crotch having portions separated by a gap, introducing a mandrel through the other end of said tubular stock to back the legs and crotch, and then under welding heat and pressure simultaneously closing said gap and welding said portions together.

6. The method of making a return bend, which consists in shaping one end of a piece of tubular stock between dies under swaging heat to form a pair of spaced legs and a crotch portion, the respective legs and the crotch portion having opposed and spaced edges separated by a cleft extending continuously around the inner sides of the legs and the crotch portion, and similar edges of the legs and crotch portion being united by spaced bridge pieces disposed between the legs, removing said bridge pieces so as to leave the space between the legs free and clear, and then subjecting said stock to pressure under welding heat to close said cleft and weld the opposed marginal edges together, and then closing the opposite end of the bend.

7. The process of making a return bend, which consists in shaping one end of a piece of tubular stock to form leg and crotch portions divided by a cleft across the crotch and along the inner sides of the legs, closing said cleft and welding the walls thereof together, and then shaping the opposite end of the stock to form a closed end or cap.

8. As an article of manufacture for use in making return bends, a tubular body open at one end and having leg and crotch portions at its opposite end, said leg and crotch portions being slotted along the inner sides of the legs and across the crotch.

9. The method of making the leg-end of a return bend, which consists in shaping one end of a piece of tubular stock so as to form a pair of parallel legs and a crotch, the space between the legs being clear and the legs and crotch being provided with a cleft extending continuously along the inner sides of the legs and across the crotch, and bringing the walls of said cleft together under pressure and simultaneously welding said walls together while sustaining both surfaces of the walls in the region of the cleft during such operation.

10. The method of making the leg-end of a return bend, which consists in shaping one end of a piece of tubular stock so as to form a pair of parallel legs and a crotch, the space between the legs being clear and the legs and crotch being provided with a cleft extending continuously along the inner sides of the legs and across the crotch, subjecting the opposed walls of said cleft to pressure in the presence of welding heat so as to simultaneously close the cleft and weld the opposed walls togther, and backing said walls internally and externally along and in the region of the cleft during such closing and welding action.

In testimony whereof we affix our signatures.

COLUMBUS K. LASSITER.
JULIUS KINDERVATER.